United States Patent
Schieda et al.

(10) Patent No.: US 12,510,118 B2
(45) Date of Patent: Dec. 30, 2025

(54) WHEEL HUB BEARING ASSEMBLY WITH SEALING DEVICE

(71) Applicants: AKTIEBOLAGET SKF, Gothenburg (SE); SKF Metal Stamping S.R.L., Frossasco (IT)

(72) Inventors: Sergio Schieda, Pinerolo (IT); Mauro Romano, Prizzi (IT); Alessio De Bortoli, Castelveccana (IT); Ettore Berutti, Grugliasco (IT)

(73) Assignees: AKTIEBOLAGET SKF, Gothenburg (SE); SKF Metal Stamping S.R.L., Frossasco (IT)

( * ) Notice: Subject to any disclaimer, the term of this patent is extended or adjusted under 35 U.S.C. 154(b) by 30 days.

(21) Appl. No.: 18/742,387

(22) Filed: Jun. 13, 2024

(65) Prior Publication Data

US 2025/0003450 A1 Jan. 2, 2025

(30) Foreign Application Priority Data

Jun. 29, 2023 (IT) .................. 102023000013518

(51) Int. Cl.
*F16C 33/76* (2006.01)
*B60B 27/00* (2006.01)
(Continued)

(52) U.S. Cl.
CPC ........ *F16C 33/763* (2013.01); *B60B 27/0005* (2013.01); *B60B 27/0073* (2013.01);
(Continued)

(58) Field of Classification Search
CPC .... F16C 19/184; F16C 19/186; F16C 33/723; F16C 33/763; F16C 33/783; F16C 2326/02; B60B 27/0005; B60B 27/0073
See application file for complete search history.

(56) References Cited

U.S. PATENT DOCUMENTS 9,914,325 B2   3/2018  Duch et al.
2014/0193107 A1* 7/2014 Baratti ............... B60B 27/0073
                                              384/446
(Continued)

FOREIGN PATENT DOCUMENTS

DE    102014208422 A1    11/2015

OTHER PUBLICATIONS

Written Opinion and Search Report from the Italian Patent Office mailed Feb. 15, 2024 in related application No. IT 102023000013518, and translation thereof.

*Primary Examiner* — Phillip A Johnson
(74) *Attorney, Agent, or Firm* — J-TEK LAW PLLC; Scott T. Wakeman; Mark A. Ussai

(57) ABSTRACT

A wheel hub bearing assembly includes a rotatable flanged inner ring, a stationary outer ring disposed about the inner ring such that a gap is defined between the inner and outer rings and a sealing device coupled with a tubular end collar of the outer ring. The sealing device includes a shield mounted in axial abutment against the tubular end collar and a sealing fluid applied in an application zone located between the tubular end collar and the shield. An element for collecting and accumulating the sealing fluid is associated with the sealing device and is arranged at the outside of the application zone in order to collect any sealing fluid escaping from the application zone.

6 Claims, 1 Drawing Sheet

(51) Int. Cl.
*F16C 19/18* (2006.01)
*F16C 33/72* (2006.01)
*F16C 33/78* (2006.01)

(52) U.S. Cl.
CPC .......... *F16C 19/184* (2013.01); *F16C 33/723* (2013.01); *F16C 33/783* (2013.01); *F16C 2326/02* (2013.01)

(56) References Cited

U.S. PATENT DOCUMENTS

| | | |
|---|---|---|
| 2017/0043619 A1 | 2/2017 | Kaiser et al. |
| 2019/0032717 A1* | 1/2019 | Shaikh ................ F16C 33/7889 |
| 2020/0130411 A1 | 4/2020 | Duch et al. |

* cited by examiner

WHEEL HUB BEARING ASSEMBLY WITH SEALING DEVICE

CROSS-REFERENCE

This application claims priority to Italian patent application no. 102023000013518 filed on Jun. 29, 2023, the contents of which are fully incorporated herein by reference.

BACKGROUND OF THE INVENTION

The present invention relates to bearings, and more particularly to a wheel hub bearing assembly.

Wheel hub bearing assemblies are generally known and may be of the driven type or a non-drive type. A typical driven wheel hub bearing assembly is interposed between an upright of the vehicle and a respective wheel, and comprise a rotatable flanged inner ring, a stationary outer ring, a gap defined between the inner and outer rings and a plurality of rolling bodies interposed in the gap between the two inner and outer rings so as to allow the inner ring to rotate with respect to the outer ring. The flanged inner ring is provided with a mounting flange for the wheel of the vehicle, while the outer ring is also provided with a respective mounting flange for the connection thereof to the upright of the vehicle. The outer ring is also provided with a tubular end collar which is axially "in front" of the flange and is delimited radially toward the outside by a cylindrical mounting surface that can be inserted into a mounting seat formed in the upright, and radially toward the inside by a cylindrical engaging surface coaxial with the cylindrical mounting surface. The tubular end collar is also delimited axially toward the outside by an annular abutment surface arranged between the cylindrical mounting surface and the cylindrical engaging surface.

In order to prevent any ingress of environmental contaminating and polluting materials (water, mud, dirt, etc.) into the gap between the inner and outer rings, the wheel hub bearing assemblies of the type described above typically further comprise a sealing device, for example, of the type described in U.S. Pat. No. 9,914,325 filed in the name of the present applicant. Such a sealing device is coupled with the tubular end collar and is engaged in the cylindrical engaging surface so as to be arranged in axial abutment against the annular abutment surface. This known sealing device is provided with a more or less cup-shaped sheet-metal shield comprising:
  a cylindrical lateral mounting wall which is keyed into the cylindrical engaging surface of the collar forcibly with radial interference and is formed by two sheet-metal layers which are completely folded onto one another,
  a substantially radially extending circular bottom wall which is integral with the cylindrical lateral mounting wall and is arranged radially at the inside of the cylindrical lateral mounting wall; and
  an annularly extending annular stop edge which is integral with the cylindrical lateral mounting wall and is arranged radially at the outside of the cylindrical lateral mounting wall and bears axially against the annular abutment surface of the collar.

The sealing device of the type described above further includes a sealing fluid which is formed by a liquid adhesive, a varnish or another liquid or semi-liquid sealing substance, or by a polymerized silicone with rubbery consistency, and is designed to be applied to the cylindrical lateral mounting wall of the shield, or to the annularly extending annular stop edge, both so as to assist the metal-to-metal sealing action between the shield and the collar, thereby preventing infiltration of water and contaminants, and also to prevent any accidental detachment of the sealing device, especially during movement of the wheel hub bearing assembly.

Even though the methods for applying the sealing fluid have now been technically advanced and refined, in such a way that only a very thin film is applied in just the right amount for the purposes described above, it has unfortunately been found that, due to the axial compression between the annular abutment surface and the annularly extending annular stop edge, the sealing fluid has nevertheless leaked outside of the sealing device in some cases, in particular outside of the annular stop edge. Such sealing fluid leakage has resulted in contamination of the cylindrical mounting surface, as well as the mounting flange of the outer ring, and has also resulted in problems with the handling of the shield and of the wheel hub bearing assembly. Furthermore, in some cases, the escape of scaling liquid from the application zone also results in the proliferation of flakes of sticky material which, dispersing along the production channels, produce a number of drawbacks such as the contamination of the associated wheel hub bearing assembly, the impairment of the functioning of the control devices, and of the devices for moving the wheel hub bearing assemblies along the production channels.

SUMMARY OF THE INVENTION

The present invention is therefore intended to provide a wheel hub bearing assembly that does not have the drawbacks described above.

The present invention provides a wheel hub bearing assembly having the features set out in the attached claims.

BRIEF DESCRIPTION OF THE SEVERAL VIEWS OF THE DRAWINGS

The invention will now be described with reference to the attached drawings, which show non-limiting embodiments of the invention, in which.

DETAILED DESCRIPTION OF THE INVENTION

Figure 1:
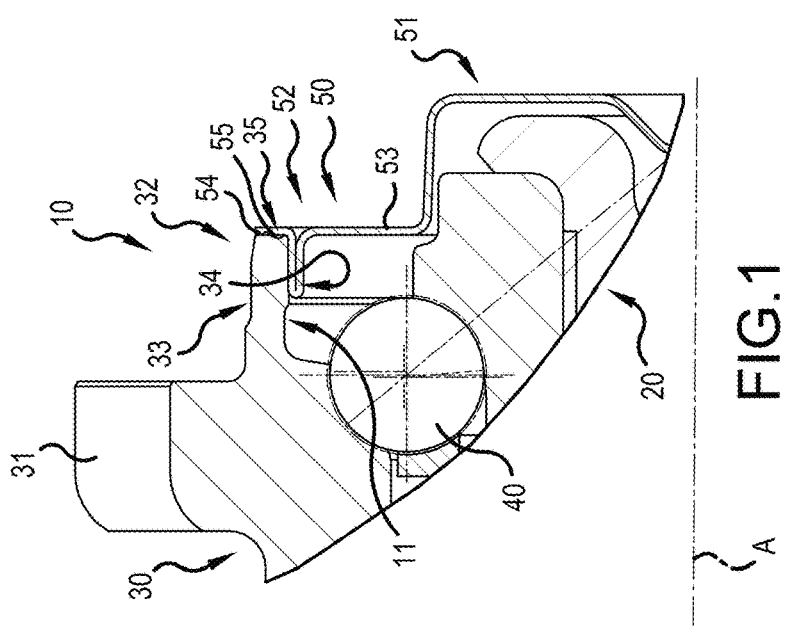
FIG. 1 is a view in axial section of a first preferred embodiment of a wheel hub bearing assembly produced according to the present innovation.

With reference to FIG. 1, a first preferred embodiment of a wheel hub bearing assembly 10 which is designed to be interposed between an upright of a vehicle and a respective wheel, the upright, the wheel and the vehicle being known and not shown. The first embodiment wheel hub assembly 10 basically comprises:
  a flanged inner ring 20 which is rotatable about an axis of rotation A;
  a stationary outer ring 30 disposed about the inner ring 20 so as to define an annular gap 11; and a plurality of rolling bodies 40 interposed in or disposed within the gap 11 between the inner ring 20 and the outer ring 30 so as to allow the inner ring 20 to rotate with respect to the outer ring 30.

The outer ring 30 is provided with a mounting flange 31 for the connection thereof to the upright of the vehicle, and with a tubular end collar 32 which is axially in front of the flange 31 and is delimited radially toward the outside by a cylindrical mounting surface 33 that can be inserted into the upright, and radially toward the inside by a cylindrical engaging surface 34 that is coaxial with the cylindrical mounting surface 33. The tubular end collar 32 is also delimited axially toward the outside by an annular abutment surface 35 arranged, and extending radially, between the cylindrical mounting surface 33 and the cylindrical engaging surface 34 and perpendicular to the axis A. The abutment surface 35 is connected to the cylindrical engaging surface 34 by a tapered surface 36 that opens toward the annular abutment surface 35 in a direction along the axis A.

In order to prevent any ingress of environmental contaminating and polluting materials (water, mud, dirt, etc.) into the gap 11, the wheel hub bearing assembly 10 further comprises a sealing device 50 which is coupled with the tubular end collar 32 and is engaged within the cylindrical engaging surface 34 so as to be arranged in axial abutment against the annular abutment surface 35.

Figure 3:
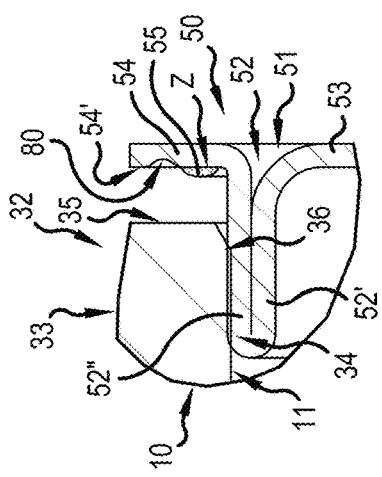
FIGS. 2 and 3 are views, on an enlarged scale and with parts in section and parts removed for clarity, of a detail of the assembly in FIG. 1 in respective operating assembly conditions.
Figure 2:
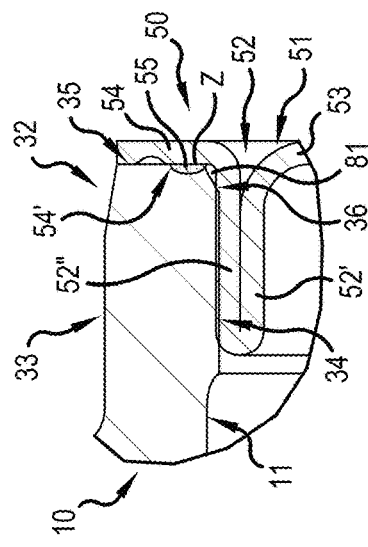

As shown also in FIGS. 2 and 3, the sealing device 50 is provided with a shield 51, which preferably but not necessarily made of sheet metal and is formed generally in the shape of a cup. The shield 51 comprises:

a cylindrical lateral mounting wall 52 which is keyed into the cylindrical engaging surface 34 of the collar 32 forcibly with radial interference and is formed by two sheet-metal layers 52' and 52" which are completely folded onto one another at an angle substantially of 180° and each have a substantially identical thickness;

a substantially radially extending circular bottom wall 53 which is integral with the layer 52' of the cylindrical lateral mounting wall 52 and is arranged radially at the inside of the cylindrical lateral mounting wall 52; and an annularly and radially extending annular stop edge 54 which is integral with the layer 52" of the cylindrical lateral mounting wall 52 and is arranged radially at the outside of the cylindrical lateral mounting wall 52 and bears axially against the annular abutment surface 35 of the collar 32.

The circular bottom wall 53 and the annular stop edge 54 both form respective right angles with the cylindrical lateral mounting wall 52, but while the circular bottom wall 53 is shaped in such a way as to essentially replicate or conform to the axially outer shape of the inner ring 20, the annular stop edge 54 is transverse to the axis A and extends, as best shown in FIG. 2, against the annular abutment surface 35 and flush with the cylindrical mounting surface 33.

The sealing device 50 further comprises a sealing fluid 55 which is formed by a liquid adhesive, a varnish or another liquid or semi-liquid sealing substance, or by a polymerized silicone with rubbery consistency, and is applied in an application zone Z of the annular stop edge 54 so as to assist the metal-to-metal sealing action between the shield 51 and the collar 32, preventing infiltration of water and contaminants. The application zone Z is located between the collar 32 and the annular stop edge 54, extends angularly around the entire circumference of the annular stop edge 54, and has a radial width L of defined and fully contained dimensions, namely smaller than the radial dimensions of both the annular abutment surface 35 and the annular stop edge 54, which, incidentally, define an axial contact zone Z' between the collar 32 and the shield 51, namely the annular stop edge 54.

Since, in the preferred embodiment of the present invention shown in FIGS. 1, 2 and 3, the sealing fluid 55 is applied to the shield 51, rather than to the collar 32, the application zone Z forms part of an axial surface 54' of the annular stop edge 54, facing the collar 32. As an alternative, if the sealing fluid 55 were applied to the collar 32, rather than to the shield 51, the application zone Z would form part of the annular abutment surface 35. Both solutions are alternatives and equivalent to each other, are essentially dependent on the process for producing the described wheel hub bearing assembly 10, and thus fall within the scope of the present invention. However, the following description only makes reference to an application zone Z forming part of the axial surface 54' for purposes of convenience only.

When the shield 51 is arranged in one of its operating pre-assembly conditions, shown in FIG. 3, namely at least with the annular abutment surface 35 of the collar 32 and the annular stop edge 54 axially spaced apart from one another, the sealing fluid 55 is applied directly to the annular stop edge 54 in such a way as to form a continuous annular film over the entire surface 54', the film having a reduced axial thickness (in the attached drawing figures the thickness is accentuated so as to be able to show the sealing fluid 55) and a radial width that is fully contained within the zone Z.

When, however, the shield 51 is arranged in one of its operating assembly conditions, shown in FIG. 2, namely with the annular abutment surface 35 of the collar 32 and the surface 54' of the annular stop edge 54 in direct contact with one another, the sealing fluid 55, despite the reduced axial thickness of the associated continuous annular film, is still axially compressed, tending to expand radially and to flow outside the zone Z.

In order to therefore prevent the sealing fluid 55 compressed between the collar 32 and the annular edge 54 from potentially escaping even from the contact zone Z' between the collar 32 and the annular stop edge 54, the wheel hub bearing assembly 10 further comprises a channel 80 for collecting and accumulating the sealing fluid 55.

The channel 80 is associated with the sealing device 50, serving to collect and accumulate the sealing fluid 55, and is formed through the surface 54' radially at the outside of the application zone Z in order to collect the sealing fluid 55 that may possibly escape from the application zone Z. In the preferred embodiment shown in FIGS. 1, 2 and 3, the channel 80 is formed by an annular groove which extends through and over the entire surface 54' about the axis A and has an inner diameter with greater dimensions or value than the dimensions or value of an outer diameter of the application zone Z.

When the shield 51 is arranged in the operating assembly condition (i.e., assembled for use of the bearing assembly 10), with the collar 32 and the annular stop edge 54 in direct contact with one another, the sealing fluid 55, as a result of the compression and in spite of being constituted by a continuous annular film with a reduced axial thickness, could still expand outside the application zone Z and, in this case, would be intercepted by the channel 80 into which it can pour without going any further radially, namely without escaping at all from the contact zone Z' between the collar 32 and the annular stop edge 54, and therefore without contaminating the cylindrical mounting surface 33 and the mounting flange 31 of the outer ring 30 as well, and without causing any problems with the handling of the shield 51 and of the wheel hub bearing assembly 10.

Figure 4:
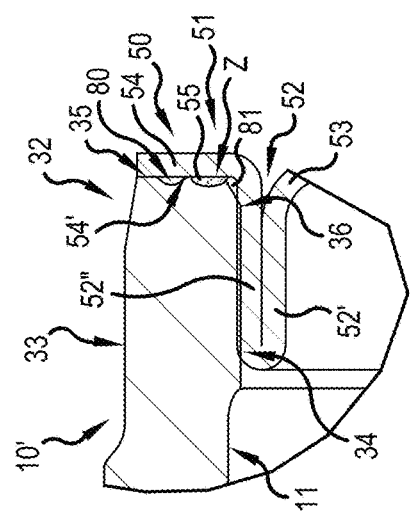
FIG. 4 is a view, on an enlarged scale and with parts in section and parts removed for clarity, of a detail of a second preferred embodiment of the assembly in FIG. 1.

The alternative embodiment of the wheel hub bearing assembly 10', as mentioned above and shown in FIG. 4, relates to a wheel hub bearing assembly 10' which differs from the wheel hub bearing assembly 10 in that the channel 80 is still associated with the sealing device 50 and serves to collect and accumulate the sealing fluid 55, but is formed through the annular abutment surface 35 of the collar 32 instead of in the annular stop edge 54, but still radially at the outside of or external to the application zone Z in order to collect the sealing fluid 55 possibly escaping from the application zone Z.

By forming the channel 80 through the annular abutment surface 35 of the collar 32, it is possible to avoid machining of the shield 51, which is more difficult given the reduced or lesser thickness of the annular stop edge 54, in particular as compared with the axial length of the collar 32. The two solutions are nevertheless alternatives.

Figure 5:
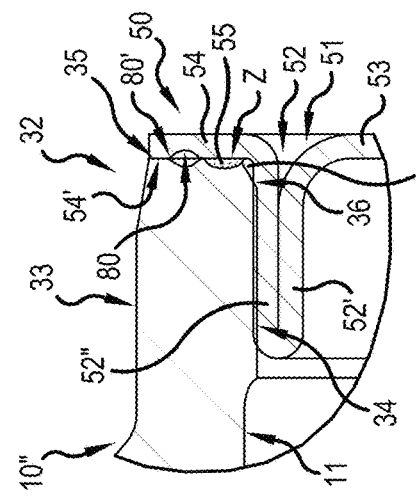
FIG. 5 is a view, on an enlarged scale and with parts in section and parts removed for clarity, of a detail of a third preferred embodiment of the assembly in FIG. 1.

A further alternative embodiment of the wheel hub bearing assembly 10", as discussed above and shown in FIG. 5, relates to a wheel hub bearing assembly 10" which differs from the wheel hub bearing assembly 10 in that it comprises a second channel 80', still associated with the sealing device 50, formed through the annular abutment surface 35 of the collar 32 in a position axially in front of the channel 80 and still radially at the outside of the application zone Z in order to collect the sealing fluid 55 possibly escaping from the application zone Z. The second channel 80' may be necessary if the production, operating and/or application conditions of the wheel hub bearing assembly 10" were to require a sealing fluid 55 applied in such an amount as to still form a continuous annular film over the entire surface 54', but with an axial thickness that is no longer greatly reduced.

It is worth noting at this point that in all three preferred and alternative embodiments of the wheel hub bearing assembly 10, 10', 10" of the present invention, the cylindrical lateral mounting wall 52, particularly the folded sheet-metal layer 52", and the annularly extending annular stop edge 54 define, at the tapered surface 36, an annular space 81 having, in axial section, a substantially triangular shape. The annular space 81, which essentially delimits the application zone Z at the bottom in the radial direction, may also provide the same functionality as the channel 80 for collecting and accumulating the sealing fluid 55. However, since the cylindrical lateral wall 52 of the shield 51 has an overall thickness that is substantially twice a thickness of the annular stop edge 54, this lateral wall 52 is also more rigid than the annular stop edge 54, causing the annular stop edge 54, during the assembly of the shield 51 in the collar 32, to deform elastically and open up radially toward the outside, namely causing the annular stop edge 54 to compress the sealing fluid 55 from the smaller or lesser diameters toward the larger or greater diameters of the application zone Z and therefore to lead or direct the scaling fluid 55 more toward the outside, namely toward the channel 80, or the channels 80 and 80', than toward the space 81.

Furthermore, all three preferred and alternative embodiments of the wheel hub bearing assembly 10, 10', 10" of the present invention are particularly advantageous when the axial contact zone Z' between the collar 32 and the shield 51, namely the annular stop edge 54, has quite contained or limited radial dimensions due to a relatively small size of the wheel hub bearing assembly.

Lastly, the presence of the channel 80 for collecting and accumulating the sealing fluid 55, or of the double channel 80 and 80' for collecting and accumulating the sealing fluid 55, not only makes it possible to have a sealing device 50 that is highly effective in terms of sealing and protection of the gap 11 because it also allows better distribution of the sealing fluid 55 in the application zone Z and around the entire circumference of the application zone Z, but also makes it possible to optimize the process for producing the wheel hub bearing assembly, making it substantially independent of the limits imposed by the deposition times for the sealing fluid 55. Moreover, a modulation of the dimensions of the collecting and accumulating channel makes it possible to further increase this independence.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A wheel hub bearing assembly comprising:
    a flanged inner ring rotatable about a central axis;
    a stationary outer ring disposed about the inner ring such that a gap is defined between the inner and outer rings, the outer ring being provided with a tubular end collar delimited axially toward the outside by an annular abutment surface;
    a sealing device coupled with the tubular end collar and including a shield, the shield having a cylindrical lateral mounting wall keyed into the tubular end collar and an annularly extending annular stop edge integral with the cylindrical lateral mounting wall and bearing axially against the annular abutment surface, a sealing fluid applied in an application zone located between the tubular end collar and the annularly extending annular stop edge; and
    means for collecting and accumulating the sealing fluid, the means for collecting and accumulating being associated with the sealing device and arranged at the outside of the application zone in order to collect any sealing fluid escaping from the application zone.

2. The wheel hub bearing assembly according to claim 1, wherein the means for collecting and accumulating the sealing fluid have radial dimensions greater than radial dimensions of the application zone.

3. The wheel hub bearing assembly according to claim 2, wherein the collecting and accumulating means includes an annular groove extending about the central axis and around the application zone.

4. The wheel hub bearing assembly according to claim 3, wherein the annular groove is formed in the annularly extending annular stop edge.

5. The wheel hub bearing assembly according to claim 3, wherein the annular groove is formed in the tubular end collar.

6. A wheel hub bearing assembly comprising:
   a flanged inner ring rotatable about a central axis;
   a stationary outer ring disposed about the inner ring such that a gap is defined between the inner and outer rings, the outer ring being provided with a tubular end collar delimited axially toward the outside by an annular abutment surface;
   a sealing device coupled with the tubular end collar and including a shield, the shield having a cylindrical lateral mounting wall keyed into the tubular end collar and an annularly extending annular stop edge integral with the cylindrical lateral mounting wall and bearing axially against the annular abutment surface, a sealing fluid applied in an application zone located between the tubular end collar and the annularly extending annular stop edge; and
   at least one annular groove formed in the abutment surface of the tubular end collar and/or in the stop edge of the shield, extending circumferentially about the axis, spaced radially outwardly from the application zone and being configured to collect any sealing fluid escaping from the application zone.

\* \* \* \* \*